US008362393B2

(12) United States Patent
Ota et al.

(10) Patent No.: US 8,362,393 B2
(45) Date of Patent: Jan. 29, 2013

(54) METHOD FOR IMPROVING RESIDUAL STRESS IN TUBULAR BODY AND APPARATUS FOR IMPROVING RESIDUAL STRESS IN TUBULAR BODY

(75) Inventors: Takahiro Ota, Takasago (JP); Shuho Tsubota, Takasago (JP); Takashi Ishide, Nagasaki (JP); Kazuhiko Kamo, Takasago (JP); Noriaki Sugimoto, Kobe (JP); Yoshiyuki Hemmi, Kobe (JP); Hironori Onitsuka, Kobe (JP); Takashi Akaba, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 575 days.

(21) Appl. No.: 12/596,308

(22) PCT Filed: Apr. 20, 2007

(86) PCT No.: PCT/JP2007/058584
§ 371 (c)(1),
(2), (4) Date: Jan. 6, 2010

(87) PCT Pub. No.: WO2008/136068
PCT Pub. Date: Nov. 13, 2008

(65) Prior Publication Data
US 2010/0108653 A1    May 6, 2010

(51) Int. Cl.
*B23K 26/00* (2006.01)
*B23K 26/02* (2006.01)
*C21D 8/10* (2006.01)
*C21D 1/09* (2006.01)
*C21D 1/00* (2006.01)

(52) U.S. Cl. ......... 219/121.85; 219/121.76; 219/121.77; 219/121.79; 219/121.82; 148/519; 148/525; 148/565

(58) Field of Classification Search .................. None
See application file for complete search history.

(56) References Cited

U.S. PATENT DOCUMENTS
(Continued)

FOREIGN PATENT DOCUMENTS
JP    57-070095 A    4/1982
JP    62-211325 A    9/1987
(Continued)

OTHER PUBLICATIONS

Japanese Office Action, dated Mar. 21, 2008, for Jap. Pat. App. No. 2005-315663.*

(Continued)

*Primary Examiner* — Hoang-Quan Ho
(74) *Attorney, Agent, or Firm* — Westerman, Hattori, Daniels & Adrian, LLP

(57) ABSTRACT

An object is to provide a method and an apparatus for improving a residual stress in a tubular body, which are enabled to improve the residual stress reliably by clearly defining controlling rage for treatment conditions without depending on an installation state and configuration of the tubular body. When an outer-circumferential surface of a welded portion of a cylindrical tubular body (2) is irradiated with a laser beam that circles around an outer circumference of the tubular body (2), a heating width W in a circumferential direction heated by the laser-beam irradiation and a laser-beam moving speed V in the circumferential direction are set so that a stress in the circumferential direction in an inner surface of the tubular body (2) produced by the heating with the laser beam is at least larger than a yielding stress of a material that the tubular body (2) is made of.

22 Claims, 14 Drawing Sheets

U.S. PATENT DOCUMENTS

| | | | |
|---|---|---|---|
| 4,694,131 A * | 9/1987 | Ino et al. | 219/611 |
| 7,485,828 B2 * | 2/2009 | Akaba et al. | 219/121.8 |
| 8,044,323 B2 * | 10/2011 | Akaba et al. | 219/121.78 |
| 8,049,137 B2 * | 11/2011 | Holman et al. | 219/121.85 |
| 2009/0302012 A1 * | 12/2009 | Ota et al. | 219/121.64 |
| 2010/0059491 A1 * | 3/2010 | Tsubota et al. | 219/121.74 |
| 2010/0326974 A1 * | 12/2010 | Ota et al. | 219/121.81 |

FOREIGN PATENT DOCUMENTS

| | | |
|---|---|---|
| JP | 63-171828 A | 7/1988 |
| JP | 02-030716 A | 2/1990 |
| JP | 08-005773 A | 1/1996 |
| JP | 10-272586 A | 10/1998 |
| JP | 2000-254776 A | 9/2000 |
| JP | 2001-150178 A | 6/2001 |
| JP | 2003-004890 A | 1/2003 |
| JP | 2005-232586 * | 9/2005 |
| JP | 2005-232586 A | 9/2005 |
| JP | 2006-015399 * | 1/2006 |
| JP | 2006-015399 A | 1/2006 |

OTHER PUBLICATIONS

PCT International Preliminary Report on Patentability, dated Nov. 10, 2009.*

International Search Report of PCT/JP2007/058584, Mailing Date of Jul. 10, 2007.

Japanese Office Action issued in corresponding Japanese Application No. 2005-315663, mailing date of Apr. 1, 2008.

* cited by examiner

S2 (WIDTH IN CIRCUMFERENTIAL DIRECTION W2' = k2 × W2)
S1 (WIDTH IN CIRCUMFERENTIAL DIRECTION W1' = k1 × W1)

METHOD FOR IMPROVING RESIDUAL STRESS IN TUBULAR BODY AND APPARATUS FOR IMPROVING RESIDUAL STRESS IN TUBULAR BODY

TECHNICAL FIELD

The present invention relates to a tubular-body residual-stress improving method and a tubular-body residual-stress improving apparatus for improving a residual stress in a tubular body such as a pipe.

BACKGROUND ART

In the installation of a tubular body, such as a large pipe, in such facilities as nuclear power plants and large-scale plants, a problem is the relieving of a stress remaining in the pipe after the welding. Welding causes a residual stress in a pipe, and the residual stress may possibly shorten the life of the pipe. For this reason, it is desirable that such residual stress caused by welding be relieved.

An induction heating stress improvement process (hereinafter, referred to as an IHSI process) is proposed as a method for relieving a residual stress in a pipe. The IHSI process is carried out as follows. Firstly, while the inner surface of a pipe is forcibly cooled by running water, the temperature of the pipe is raised by being inductively heated from the outer-surface side using a high-frequency induction heating coil. The pipe thus heated has a temperature gradient in the wall-thickness direction near a part satisfying stress corrosion cracking (hereinafter, referred to as SCC) conditions of the pipe. Thereafter, the heating of the pipe is stopped, but the cooling continues by running the water along the inner surface until the pipe has a substantially uniform temperature in the wall-thickness direction of the pipe. As a result, a residual stress that has been tensile around the welded part is reduced or is turned to be compressive (see Patent Documents 1 to 3).

The following are some of the other methods proposed for relieving a residual stress in a pipe. In a method, a surface of a pipe made of, for example, stainless steel is heated to the solution heat-treatment temperature, or alternatively is melted by laser irradiation so that the residual stress in the backside surface of the pipe can be reduced (see Patent Documents 4 to 6).

Patent Document 1: JP-A-57-70095
Patent Document 2: JP-A-2001-150178
Patent Document 3: JP-A-10-272586
Patent Document 4: JP-A-2003-004890
Patent Document 5: JP-A-8-5773
Patent Document 6: JP-A-2000-254776

DISCLOSURE OF THE INVENTION

Problems to be Solved by the Invention

In the IHSI process, when the heating is finished, the temperature of the outer-circumferential surface of the pipe has to differ from that of the inner-circumferential surface thereof by at least a certain predetermined value. Accordingly, when a pipe has been already installed and thus the inside of the pipe can be cooled down by running water, the pipe can easily be treated by the IHSI process. In contrast, when it is impossible to keep water running inside a pipe, it is difficult to treat the pipe by the IHSI process. In addition, in the high-frequency induction heating that is performed in the IHSI process so as to produce a temperature gradient in the wall-thickness direction of the pipe, the depth and area of heat transmission vary depending on the material properties (dielectric constants) of the pipe heated by the high-frequency induction coil. For this reason, it is difficult to limit the area that is to be heated. Moreover, the heating by use of the high-frequency induction coil requires a large-sized system that consumes a large amount of energy. Furthermore, in a case of heating a portion including members made of different materials and thus different dielectric constants, such as a dissimilar joint, it is difficult to provide a constant temperature gradient in the wall-thickness direction.

In addition, insufficient or excessive heating may possibly occur by the above method in which a surface of a pipe made of, for example, stainless steel is heated to the solution heat-treatment temperature, or alternatively is melted by laser irradiation in order to reduce the stress in the backside surface. Excessive heating causes an area near the heated part to be exposed to a sensitizing temperature, and thus gives a harmful effect to the material of the pipe itself, which in turn leads to, for example, formation of oxidation scales in the heated surface. The oxidation scales, if formed, need to be removed. A work to remove the scales, if performed in a nuclear power plant, may increase the possibility that the workers might be exposed to radiation. With insufficient heating, on the other hand, the residual stress cannot be improved to a satisfactory extent, and thus the SCC cannot be precluded completely.

The present invention has been made in view of the above-described problems. An object of the present invention, therefore, is to provide a tubular-body residual-stress improving method and a tubular-body residual-stress improving apparatus which are capable of guaranteeing an improvement in residual stress in a tubular body without depending on an installation state and configuration of the tubular body.

Means for Solving the Problems

A first aspect of the invention for solving the above problems provides a tubular-body residual-stress improving method wherein, when an outer-circumferential surface of a welded portion of a cylindrical tubular body is locally irradiated with a laser beam and an irradiation area is rotated in a circumferential direction, a heating width in the circumferential direction heated by the laser-beam irradiation is set so that a stress in the circumferential direction in an inner surface of the tubular body produced by the heating with the laser beam is at least larger than a yielding stress of a material that the tubular body is made of.

A second aspect of the invention for solving the above problems provides the tubular-body residual-stress improving method according to the first aspect, wherein the heating width in the circumferential direction is at least 0.15 times an external diameter of the tubular body or preferably at least 0.4 times the external diameter thereof.

A third aspect of the invention for solving the above problems provides a tubular-body residual-stress improving method, wherein, when an outer-circumferential surface of a welded portion of a cylindrical tubular body is irradiated with a laser beam that circles around an outer circumference of the tubular body, a heating width in a circumferential direction heated by the laser-beam irradiation and a laser-beam moving speed in the circumferential direction are set so that a stress in the circumferential direction in an inner surface of the tubular body produced by the heating with the laser beam is at least larger than a yielding stress of a material that the tubular body is made of.

A fourth aspect of the invention for solving the above problems provides the tubular-body residual-stress improving method according to the third aspect, wherein a Fourier number F is determined by a formula $F=a\times(W/V)/t^2$, where W is the heating width in the circumferential direction, V is the moving speed in the circumferential direction, a is thermal diffusivity of the tubular body, and t is a wall thickness of the tubular body, and the heating width W in the circumferential direction and the moving speed V in the circumferential direction are determined so that the Fourier number F satisfies $0.05 \leq F \leq 1.4$, or preferably $0.1 \leq F \leq 0.6$.

A fifth aspect of the invention for solving the above problems provides the tubular-body residual-stress improving method according to the third aspect, wherein, when an inner-circumferential surface of the tubular body is forcibly cooled, a Fourier number F is determined by a formula $F=a\times(W/V)/t^2$, where W is the heating width in the circumferential direction, V is the moving speed in the circumferential direction, a is thermal diffusivity of the tubular body, and t is a wall thickness of the tubular body, and the heating width W in the circumferential direction and the moving speed V in the circumferential direction are set so that the Fourier number F satisfies $0.05 \leq F$, or preferably $0.1 \leq F$.

A sixth aspect of the invention for solving the above problems provides the tubular-body residual-stress improving method according to the fifth aspect, wherein, when the tubular body is placed horizontally, the laser-beam irradiation starts at a position which is located in a vicinity of a highest point of the tubular body and which is offset rearwards from the highest point in an advancing direction of the laser beam.

A seventh aspect of the invention for solving the above problems provides the tubular-body residual-stress improving method according to any one of the first to sixth aspects, wherein a plurality of laser beams are used, and an area to be heated by irradiation with the plurality of laser beams is heated uniformly in an axial direction of the tubular body.

An eighth aspect of the invention for solving the above problems provides the tubular-body residual-stress improving method according to the seventh aspect, wherein the area to be heated has a length in the axial direction which is not shorter than $3\sqrt{(rt)}$, or preferably not shorter than $4\sqrt{/(rt)}$, where t is the wall thickness of the tubular body, and r is a radius of the tubular body.

A ninth aspect of the invention for solving the above problems provides the tubular-body residual-stress improving method according to any one of the first to eighth aspects, wherein, when the tubular body is formed by welding members made of different materials together, and the welded portion of the tubular body is irradiated with the laser beam, different heating widths in the circumference direction are set respectively for the different materials of the tubular body.

A tenth aspect of the invention for solving the above problems provides the tubular-body residual-stress improving method according to any one of the first to ninth aspects, wherein, when the tubular body is formed by welding members of different thicknesses together, and the welded portion of the tubular body is irradiated with the laser beam, different heating widths in the circumference direction are set respectively for the different thicknesses of the tubular body.

An eleventh aspect of the invention for solving the above problems provides a tubular-body residual-stress improving apparatus comprising an optical head which locally irradiates a outer-circumferential surface of a welded portion of a cylindrical tubular body with a laser beam and which is capable of adjusting an irradiation area, wherein a heating width in a circumferential direction heated by the laser-beam irradiation is set by the adjustment of the optical head so that a stress in the circumferential direction in an inner surface of the tubular body produced by the heating with the laser beam is at least larger than a yielding stress of a material that the tubular body is made of.

A twelfth aspect of the invention for solving the above problems provides the tubular-body residual-stress improving apparatus according to the eleventh aspect, wherein the heating width in the circumferential direction is at least 0.15 times an external diameter of the tubular body or preferably at least 0.4 times the external diameter thereof.

A thirteenth aspect of the invention for solving the above problems provides a tubular-body residual-stress improving apparatus comprising:

rotationally driving means which moves circling around an outer circumference of a cylindrical tubular body and whose speed of moving in a circumferential direction is controllable;

an optical head which is held by the rotationally driving means, irradiates an outer-circumferential surface of a welded portion of the tubular body with a laser beam, and is capable of adjusting an irradiation area, wherein a heating width in the circumferential direction heated by the laser-beam irradiation is set by the adjustment of the optical head and a moving speed of the optical head in the circumferential direction is set by the control of the rotationally driving means so that a stress in the circumferential direction in an inner surface of the tubular body produced by the heating with the laser beam is at least larger than a yielding stress of a material that the tubular body is made of.

A fourteenth aspect of the invention for solving the above problems provides the tubular-body residual-stress improving apparatus according to the thirteenth aspect, wherein a Fourier number F is determined by a formula $F=a\times(W/V)/t^2$, where W is the heating width in the circumferential direction, V is the moving speed in the circumferential direction, a is thermal diffusivity of the tubular body, and t is a wall thickness of the tubular body, and the heating width W in the circumferential direction and the moving speed V in the circumferential direction are determined so that the Fourier number F satisfies $0.05 \leq F \leq 1.4$, or preferably $0.1 \leq F \leq 0.6$.

A fifteenth aspect of the invention for solving the above problems provides the tubular-body residual-stress improving apparatus according to the thirteenth aspect, further comprising cooling means for forcibly cooling an inner-circumferential surface of the tubular body, wherein a Fourier number F is determined by a formula $F=a\times(W/V)/t^2$, where W is the heating width in the circumferential direction, V is the moving speed in the circumferential direction, a is thermal diffusivity of the tubular body, and t is a wall thickness of the tubular body, and the heating width W in the circumferential direction and the moving speed V in the circumferential direction are set so that the Fourier number F satisfies $0.05 \leq F$, or preferably $0.1 \leq F$.

A sixteenth aspect of the invention for solving the above problems provides the tubular-body residual-stress improving apparatus according to the fifteenth aspect, wherein, when the tubular body is placed horizontally, the rotationally driving means makes the laser-beam irradiation start at a position which is located in a vicinity of a highest point of the tubular body and which is offset rearwards from the highest point in an advancing direction of the laser beam.

A seventeenth aspect of the invention for solving the above problems provides the tubular-body residual-stress improving apparatus according to any one of the eleventh to sixteenth aspects, wherein a plurality of the optical heads are arranged in an axial direction of the tubular body, and an area to be heated by irradiation with laser beams from the plurality of the optical heads is heated uniformly in the axial direction of the tubular body.

An eighteenth aspect of the invention for solving the above problems provides the tubular-body residual-stress improving apparatus according to the seventeenth aspect, wherein the area to be heated is set to a length in the axial direction which is not shorter than $3\sqrt{(rt)}$, or preferably not shorter than $4\sqrt{(rt)}$, where t is the wall thickness of the tubular body, and r is a radius of the tubular body.

A nineteenth aspect of the invention for solving the above problems provides the tubular-body residual-stress improving apparatus according to any one of the eleventh to eighteenth aspects, wherein, when the tubular body is formed by welding members made of different materials together, and the welded portion of the tubular body is irradiated with the laser beam, different heating widths in the circumference direction are set respectively for the different materials of the tubular body by the adjustment of each optical head.

A twentieth aspect of the invention for solving the above problems provides the tubular-body residual-stress improving apparatus according to any one of the eleventh to nineteenth aspects, wherein, when the tubular body is formed by welding members of different thicknesses together, and the welded portion of the tubular body is irradiated with the laser beam, different heating widths in the circumference direction are set respectively for the different thicknesses of the tubular body by the adjustment of each optical head.

Effects of the Invention

According to the present invention, the heating width in the circumferential direction and the moving speed in the circumferential direction are set so that a stress in the circumferential direction in an inner surface of the tubular body produced by the heating with the laser beam is larger than the yielding stress of the material that the tubular body is made of. For this reason, the residual stress after welding (tensile stress) in the inner surface of the tubular body can be reliably improved by the heating with the laser beam, irrespective of the installation state of the tubular body. As a consequence, the SCC that occurs in the pipes installed in such facilities as a nuclear power plant can be reliably prevented.

In addition, when the laser-beam heating is performed with the inner surface of the tubular body being forcibly cooled, the heating width in the circumferential direction and the moving speed in the circumferential direction can be set within wider setting ranges, respectively. Accordingly, the residual stress can be improved more reliably. Moreover, the heating width is set in accordance with the material that the tubular body is made of and with the wall thickness of the tubular body so that the residual stress can be improved more reliably, irrespective of the configuration of the tubular body itself.

Note that the present invention is based on the LSIP method. So, in principle, the residual stress can be improved through local heating of a movable heat source, and such treatment can be carried out using a small-capacity laser oscillator. For this reason, the use of the small-sized laser oscillator makes the preparatory work easier than in the case of the high-frequency heating by the IHSI method. In addition, since the heat enters from the surface, a temperature difference can be produced in the wall-thickness direction even when the tubular body is a thin-walled pipe. In addition, the use of the temperature difference between the inner and outer surfaces that is produced at the heating of the outer surface makes the forcible cooling of the inner surface unnecessary. For these reasons, the present invention has a wider application range than the case of the conventional IHSI method.

BRIEF DESCRIPTION OF THE DRAWINGS

FIG. 2 shows charts provided to explain the residual-stress improvement achieved by the present invention.

FIG. 9 shows diagrams provided to explain a case where the residual-stress improving apparatus according to the present invention is used for the residual-stress improvement of a tubular body having different wall-thicknesses therein.

EXPLANATION OF REFERENCE NUMERALS

Figure 1:
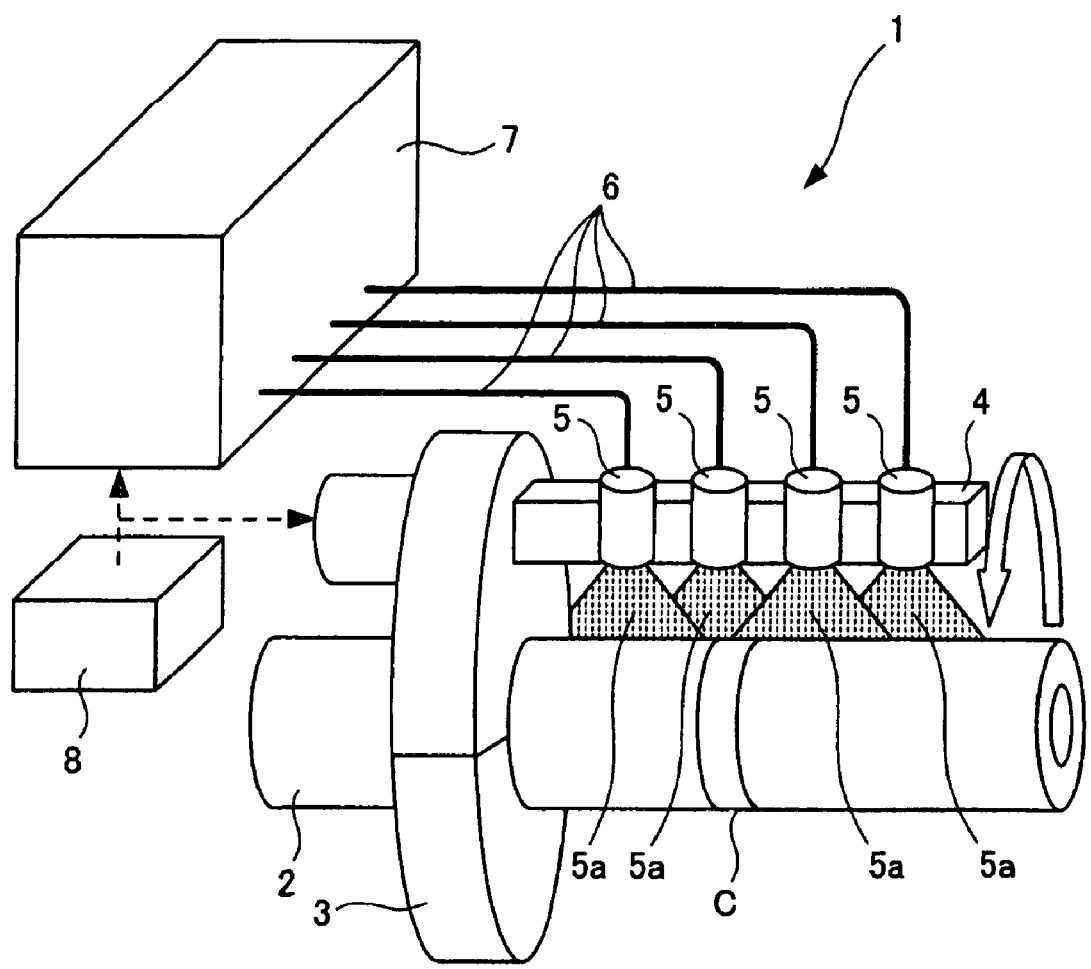
FIG. 1 is a schematic diagram illustrating a tubular-body residual-stress improving apparatus according to the present invention.

1: residual-stress improving apparatus
2: pipe
3: rotationally driving apparatus
4: arm portion
5: optical head
6: optical fiber
7: laser oscillator
8: control unit
10: pipe
11: pipe
12: thermal sleeve
13: pipe
14: cooling water
21: pipe
22: cooling water
23: laser beam
C: welded portion
D: outer diameter of pipe
S: heating area
V: moving speed in circumferential direction
W: heating width in circumferential direction

BEST MODES FOR CARRYING OUT THE INVENTION

With reference to FIGS. 1 to 13, detailed descriptions will be given as to a tubular-body residual-stress improving method and a tubular-body residual-stress improving apparatus according to the present invention.

Embodiment 1

FIG. 1 is a schematic diagram illustrating a tubular-body residual-stress improving apparatus according to the present invention.

As FIG. 1 shows, a residual-stress improving apparatus 1 includes a rotationally driving apparatus 3 (rotationally driving means), an arm portion 4, plural optical heads 5, a laser oscillator 7, and a control unit 8. The rotationally driving apparatus 3 is disposed so as to be capable of moving circling around the outer circumference of a pipe 2, which is a cylindrical tubular body. The rotationally driving apparatus 3 is capable of controlling its moving speed in the circumferential direction of the pipe 2. The arm portion 4 is held by the rotationally driving apparatus 3, extends along the axial direction of the pipe 2, and is capable of circling concentrically with and around the pipe 2. Each optical head 5 is held by the arm portion 4, and irradiates a predetermined area of the outer-circumferential surface of a welded portion C of the pipe 2 with a laser beam 5a. The laser oscillator 7 is connected to the optical heads 5 by means of plural optical fibers 6, respectively, and supplies laser beams to the optical heads 5 through the optical fibers 6, respectively. The control unit 8 controls the rotationally driving apparatus 3, the laser oscillator 7, and the like.

The rotationally driving apparatus 3 is detachably attached to the outer circumference of the pipe 2. The rotationally driving apparatus 3 can be placed freely at any position where the residual stress needs to be improved such for example as at a position located around a welded portion c. Note that the rotationally driving apparatus 3 may have any configuration as long as the rotationally driving apparatus 3 holds the pipe 2 on its inner-circumference side and has a rotatable outer-circumference side where the arm portion 4 is held. For example, a possible configuration may have a fixing portion located on its inner-circumference side and a circling portion on its outer-circumference side. The fixing portion is a fixing side that holds the pipe 2. The circling portion is a circling side which holds the arm portion 4 and circles concentrically with and around the pipe 2.

The optical heads 5, the optical fibers 6, and the laser oscillator 7 together form a heating optical system. The optical heads 5 are attached to the arm portion 4 so as to be arranged along the axial direction of the pipe 2. The optical heads 5 thus arranged irradiates a predetermined area of the outer-circumferential surface of the pipe 2 with the laser beams 5a so that the predetermined area can be heated uniformly. Either each of the optical heads 5 as a whole or just some of its components such as a lens and a mirror may be mounted on, for example, a sliding mechanism that is capable of changing the position of the above-mentioned member or members mounted thereon. By changing the position, the irradiation length in the axial direction and the irradiation width in the circumferential direction are adjusted, and thus the area to be heated is adjusted.

A residual stress is improved in the residual-stress improving apparatus 1 according to the present invention in the following way. The area to be heated is adjusted by adjusting the optical heads 5. Then, the control unit 8 controls the output of the laser oscillator 7, and also causes the rotationally driving apparatus 3 to move circling while controlling the moving speed thereof at a predetermined moving speed. Circling around the outer circumference of the pipe 2, the optical heads 5 irradiate a predetermined area of the outer-circumferential surface of the pipe 2 with the laser beams 5a. Thus, the predetermined area of the outer-circumferential surface of the pipe 2 is heated. By using a temperature difference between the inner surface and the outer surface of the pipe 2 that is caused by this heating, the inner surface is brought into a tensile-yield state. As a consequence, when the pipe 2 is cooled down, the residual stress of the inner surface thereof is reduced or is improved so as to be turned to a compressive stress. Note that the heating temperature is preferably below the solution heat-treatment temperature. In addition, in the present invention, it is not necessary to forcibly cool the inner-surface side of the pipe 2.

A further description will be given below as to the residual-stress improving method. Suppose a case where the residual stress of a predetermined area of the tubular body is intended to be improved. In this case, the predetermined area is firstly heated so that there can be a predetermined difference between the temperature of the outer surface of the area and that of the inner surface thereof. The heating turns the outer surface to a state of compressive stress, and turns the inner surface to a state of tensile stress and further to a state of tensile yield. Once the heating is finished, the inner and the outer surfaces of the predetermined area are cooled down. Then, the outer surface is turned to a state of tensile stress, and the inner surface is turned to a state of compressive stress. Accordingly, the residual stress of the inner surface can be improved from a state of tensile stress to a state of compressive stress. Since the residual stress generated in the inner surface of the tubular body can be improved from the tensile state to the compressive state in the above-described way, the stress corrosion cracking can be prevented from occurring in the inner surface of the tubular body.

The improvable tensile-stress amount can be controlled according to the above-described tensile-stress improving method, and the control relies on the amount of strain (stress) given when the tubular body is heated. This will be described based on the stress-strain curves shown in FIGS. 2(a) and 2(b).

Figure 2A:
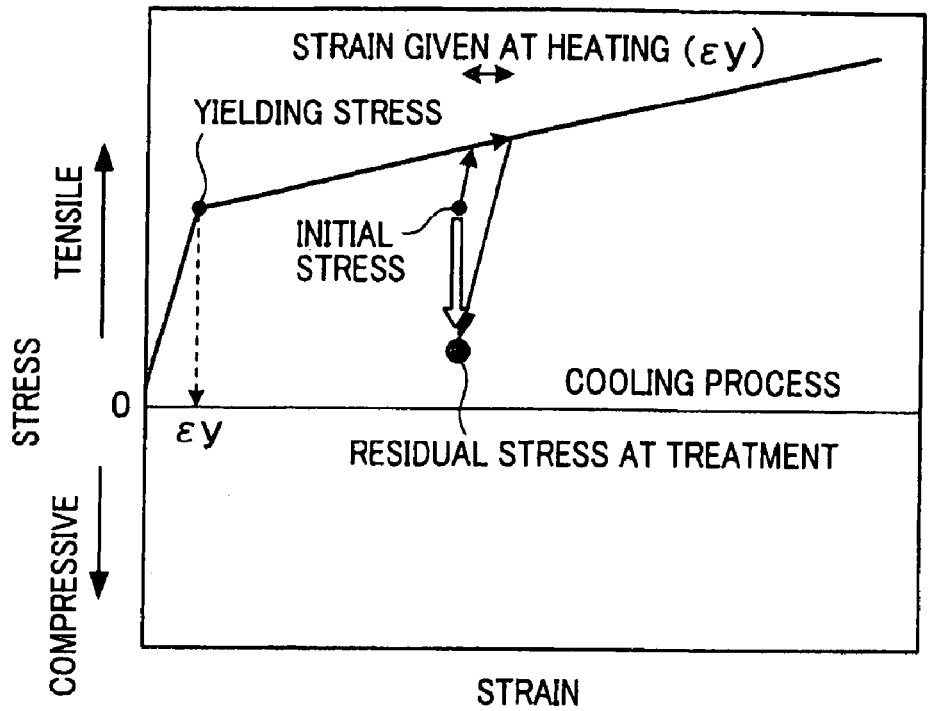
FIG. 2(a) is a chart of a case where the strain given to the pipe is as large as one corresponding to the yield stress.

FIG. 2(a) is a chart provided to explain the change in the stress of the target pipe. The chart is of a case where, while the material that the target pipe is made of has a certain yielding stress (the corresponding strain amount=∈y), the target pipe is given a strain of the amount ∈y. To put it differently, FIG. 2(a) is of a case where the stress produced at heating is as large as the yielding stress. As FIG. 2(a) shows, if the stress produced at heating is as large as the yielding stress, the tensile stress (strain amount) caused in the inner surface by the heating allows the residual stress to be reduced from the initial stress (tensile residual stress) after the heating (after the treatment) followed by a cooling process.

Figure 2B:
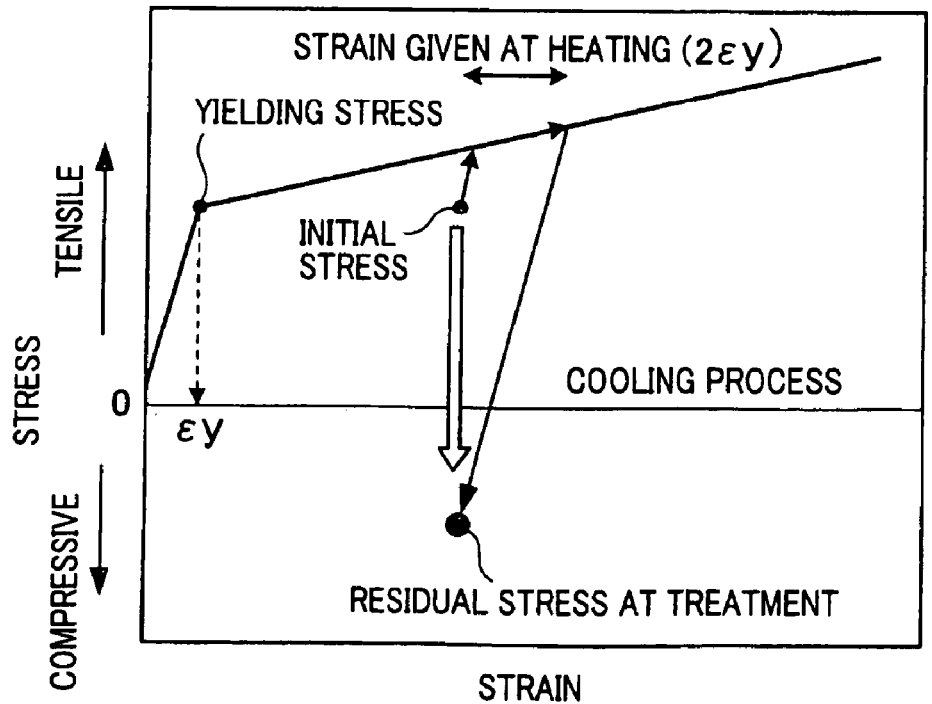
FIG. 2(b) is a chart of a case where the strain given to the pipe is twice as large as one corresponding to the yield stress.

FIG. 2(b) is a chart provided to explain the change in the stress of the target pipe, but this chart is of a case where, while the material that the target pipe is made of has a certain yielding stress (the corresponding strain amount=∈y), the target pipe is given a strain of an amount 2∈y. To put it differently, FIG. 2(b) is of a case where the stress produced at heating is twice as large as the yielding stress. As FIG. 2(b) shows, if the stress produced at heating is twice as large as the yielding stress, the tensile stress (strain amount) caused in the inner surface by the heating allows the residual stress to be improved from the initial stress (tensile residual stress) to a compressive stress after the heating (after the treatment) followed by a cooling process.

The description given above reveals that an improvement of the residual stress to a desired stress can be achieved by the amount of stress (amount of strain) produced by the heating. It also reveals that, to achieve the above-mentioned object, the heating only has to produce a strain of an amount that is at least not smaller than the amount equivalent to the yielding stress, or preferably an amount that is equal to or larger than the amount that is twice as much as the amount of the yielding stress. Accordingly, when the residual-stress improving apparatus 1 of the present invention is used to heat the outer-circumferential surface of the pipe 2, the conditions at the laser heating only has to be set so that the stress in the circumferential direction produced at the heating can result in a strain of an amount at least not smaller than the yielding stress, or preferably result in a strain of an amount that is twice as large as the amount equivalent to the yielding stress.

The conditions under which the laser heating is performed were examined. Note that the heating area of the present invention is defined as an irradiation area of a laser beam with an energy density of $1/e^2$.

What has to be taken into consideration when the laser heating is performed on the outer-circumferential surface of the welded portion of the cylindrical pipe 2 is the fact that a difference in the heating width in the circumferential direction results in a difference in the stress produced at the heating. To put it differently, a difference in the heating width in the circumferential direction results in a difference in the amount of residual stress reduced by the treatment. For example, a narrow heating width in the circumferential direction results in a bending that occurs locally, and such a local bending has a harmful influence on the effect of improving the residual stress. To be more specific, in a case of a narrow heating width, a bending is caused in the heated portion by the local thermal expansion during the heating, and the bending results in a compressive stress, which prevents the residual stress from being reduced after the cooling. In contrast, in a case of a wide heating width, though a local bending is produced during the heating, such a local bending has no influence on the highest-temperature region. Instead, the temperature difference between the inner and outer surfaces results in a tensile stress in the inner surface, and the residual stress is reduced after the cooling.

Figure 3:
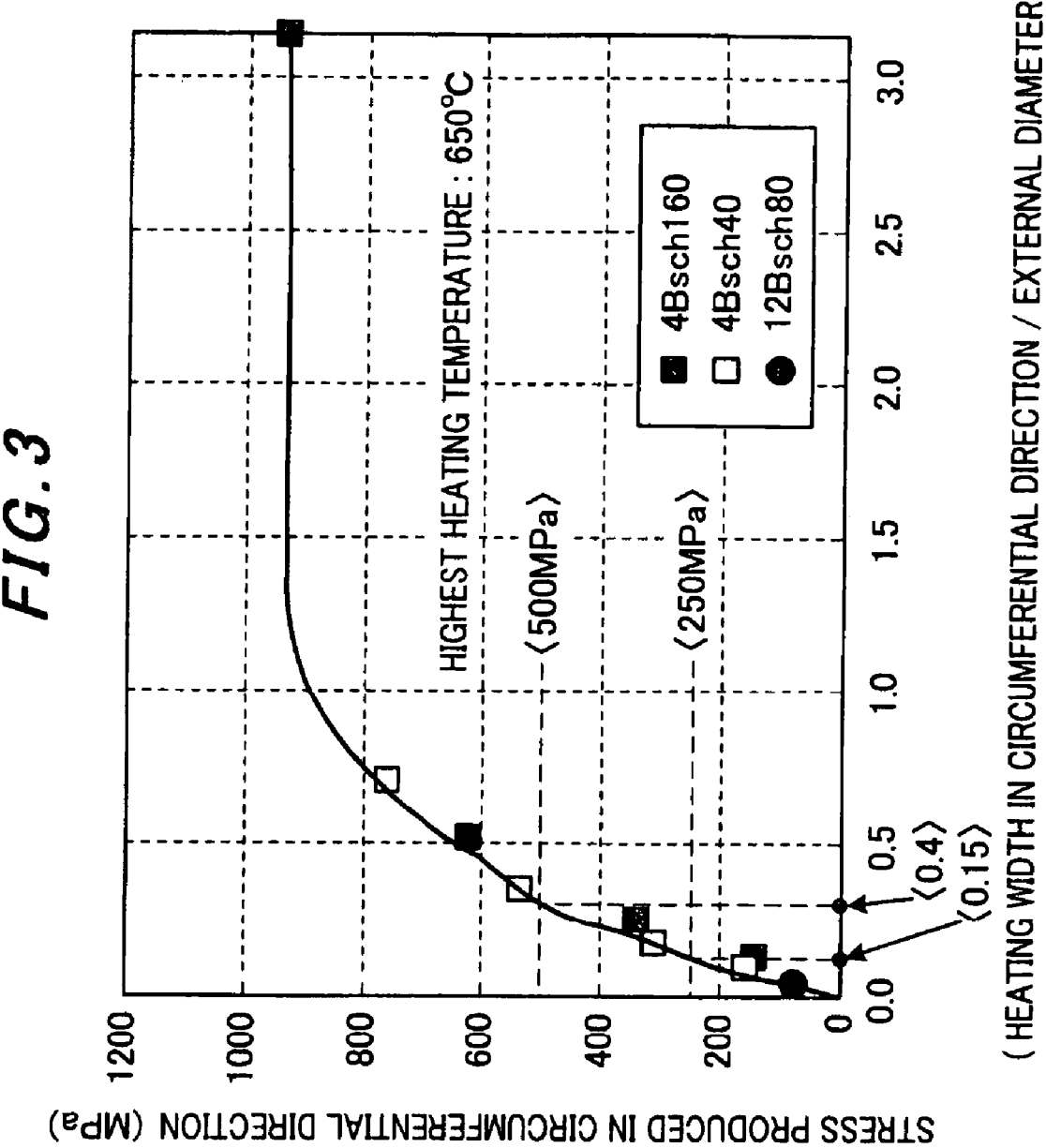
FIG. 3 is a graph illustrating the relationship between the stress produced in the circumferential direction and the proportion of the heating width in the circumferential direction to the external diameter, in the present invention.

What has just been described above was examined by a numerical analysis, and the results of the examination are shown in FIG. 3, which illustrates the relationship between the stress produced in the circumferential direction and the proportion of the heating width in the circumferential direction to the external diameter. As FIG. 3 shows, the stress produced in the circumferential direction firstly increases monotonically along with the increase in the proportion of the heating width in the circumferential direction to the external diameter. Then, the stress produced in the circumferential direction becomes constant while the proportion of the heating width in the circumferential direction to the external diameter is approximately 1.0 or above. Now, suppose a case where the target pipe is made of stainless steel and the stress produced by the laser heating is equal to or larger than the yielding stress of the stainless steel (250 MPa). In this case, a proportion of 0.15 or higher is the appropriate range for the proportion of the heating width in the circumferential direction to the external diameter. Alternatively, if the stress produced by the laser heating is at least twice as large as the yielding stress of the stainless steel (500 MPa), a proportion of 0.4 or higher is the appropriate range for the proportion of the heating width in the circumferential direction to the external diameter. Accordingly, the results of the examination by the numerical analysis reveal that a desired effect of improving the residual stress can be obtained in a case of the stainless steel by setting the heating width in the circumferential direction at 0.15 times the external diameter or larger.

The residual-stress improving method of the present invention is carried out in the following way. The outer-circumferential surface of the welded portion of the cylindrical pipe 2 is irradiated with laser beams while the optical heads 5 are made to circle around the outer circumference of the pipe 2. A difference in the temperature is then formed in the wall-thickness direction of the pipe, and the stress caused by the temperature difference is used for the residual-stress improvement. Thus, the temperature distribution in the wall-thickness direction in an unsteady state is important. For this reason, to obtain a proper temperature distribution in the wall-thickness direction (to obtain a proper stress produced in the circumferential direction), the conditions at the time of laser heating need to be examined with respect to the heating time. From this point of view, optimal conditions for the laser heating was examined by an numerical analysis with a Fourier number F $(=a \times \tau/t^2)$ that is a dimensionless number representing the temperature distribution, where a (mm²/sec) denotes the thermal diffusivity of the pipe, t (mm) denotes the wall thickness of the pipe, τ (sec) denotes the heating time.

Figure 4:
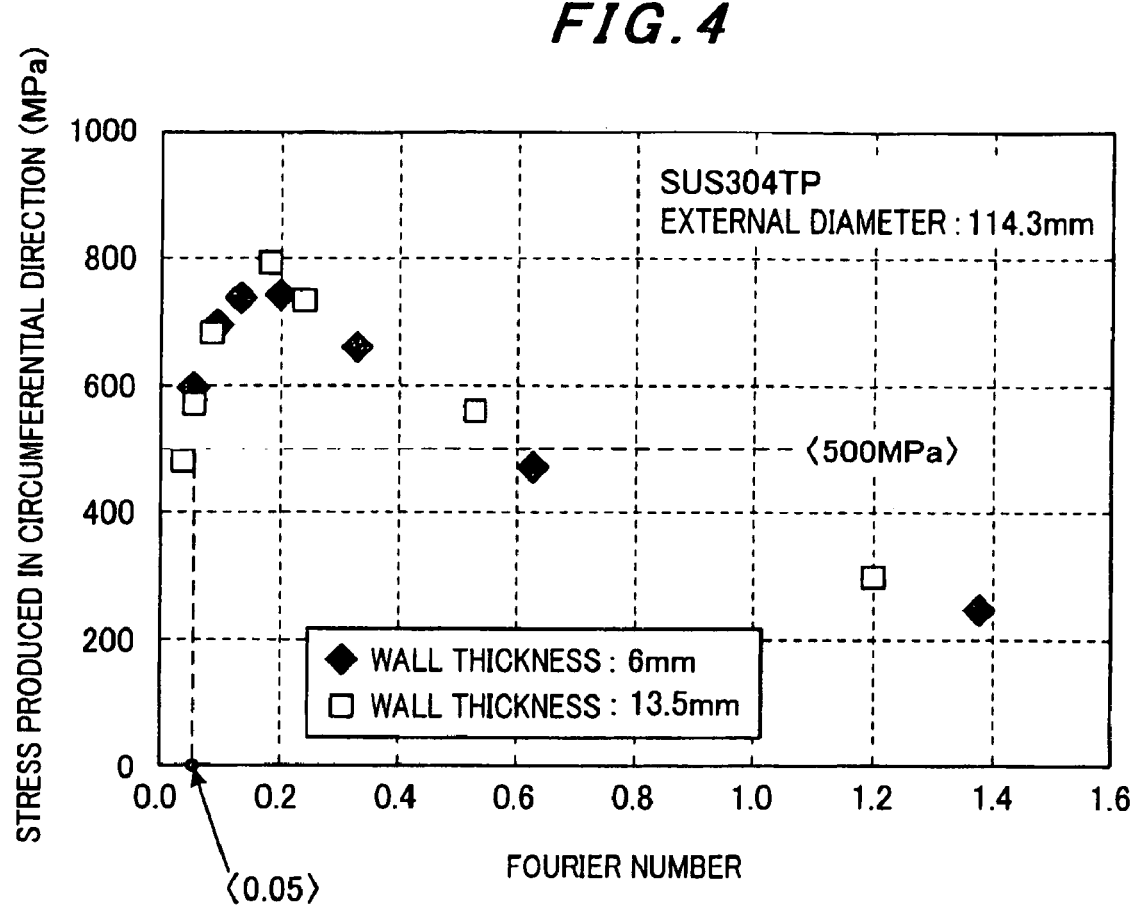
FIG. 4 is a graph illustrating the relationship between the stress produced in the circumferential direction and the Fourier number, in the present invention.
Figure 5:
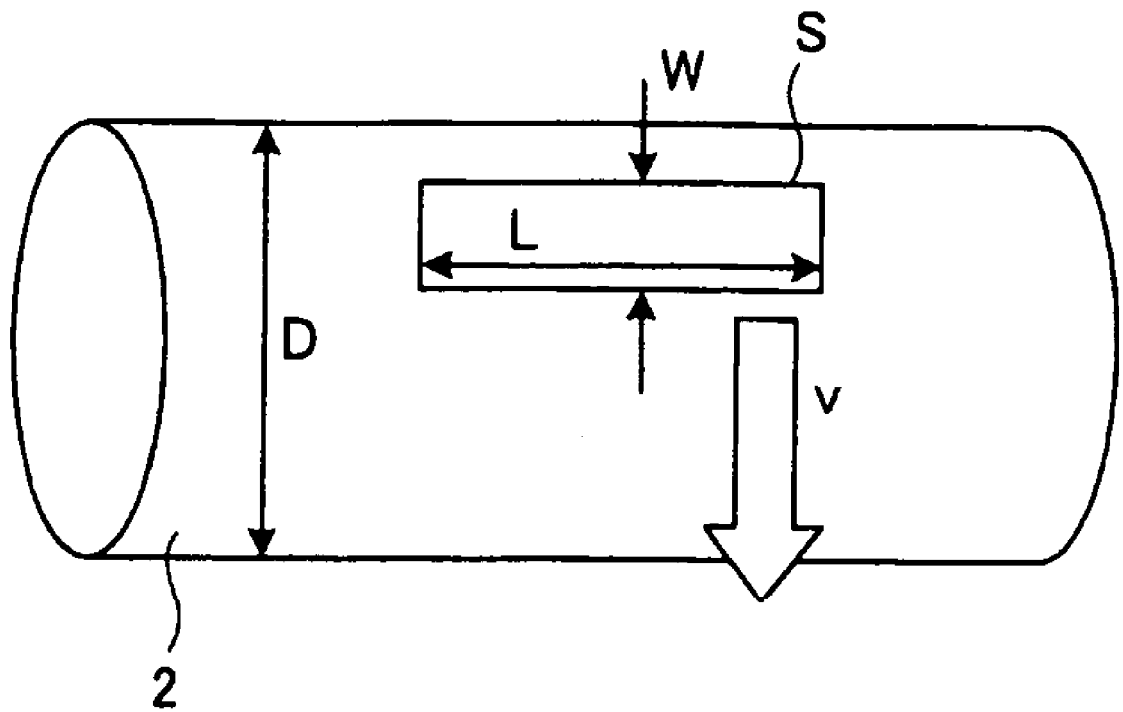
FIG. 5 is a diagram provided to explain the heating width in the circumferential direction and the moving speed in the circumferential direction which are controlled in the residual-stress improving apparatus according to the present invention.

Specifically, as FIG. 4 shows, a Fourier number F for the optimal conditions at the laser heating was obtained from the relationship between the Fourier number F and the calculated value of the thermal stress of the cylindrical pipe. Here, the heating time τ is defined by a division of the heating width W in the circumferential direction by the moving speed V, in the circumferential direction, of the laser beams. Accordingly, the Fourier number F is defined by a formula $F=a\times(W/V)/t^2$. As FIG. 4 shows, a Fourier number of approximately 0.2 results in the largest stress produced in the circumferential direction (the stress in the circumferential direction produced in the inner surface of the pipe) irrespective of the wall thickness of the pipe. As the Fourier number increases beyond that point, the stress produced in the circumferential direction becomes gradually smaller. Here, suppose a case where the target pipe is made of stainless steel. In this case, if the stress produced by the laser heating is equal to or larger than the yielding stress of the stainless steel (250 MPa), the proper Fourier number ranges from 0.05 to 1.4, approximately. Alternatively, if the stress produced by the laser heating is at least twice as large as the yielding stress of the stainless steel (500 MPa), the proper Fourier number ranges from 0.05 to 0.6, approximately. Accordingly, since both the thermal diffusivity a of the pipe and the wall-thickness t of the pipe are constant, the controlling of the heating width W in the circumferential direction and of the moving speed V in the circumferential direction at their respective appropriate values allows the above-mentioned proper Fourier-number range to be achieved.

The following conclusion can be obtained by the above-described findings. The residual-stress improving apparatus 1 of the present invention has to be controlled by: setting the heating width W in the circumferential direction to a value of at least 0.15 or preferably at least 0.4 times the external diameter D, when a predetermined area S is heated by the irradiation of the predetermined area S of the outer-circumferential surface of the pipe with the laser beams by means of the optical heads 5 that are made to move circling around the outer-circumferential surface. In addition, the relationship that has to hold true between the heating width W in the circumferential direction and the moving speed V in the circumferential direction is: $0.05\times t^2/a<W/V<1.4\times t^2/a$; or preferably, $0.1\times t^2/a<W/V<0.6\times t^2/a$ (see FIG. 5).

As has been described thus far, according to the present invention, limits are set for the heating width W in the circumferential direction and the moving speed V in the circumferential direction for the purpose either of reliably reducing the residual stress or of reliably improving the residual stress to a compressive residual stress. In addition, it is preferable that, as limits for the heating conditions, a limit should be set not only for the heating width W in the circumferential direction but also for the heating length L in the axial direction (see FIG. 5).

Figure 6A:
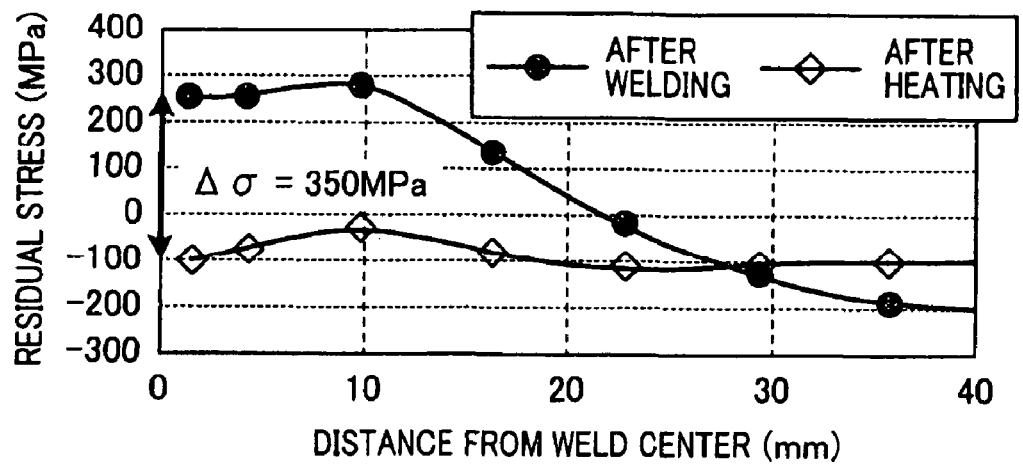
FIG. 6 shows graphs provided to explain the heating length in the axial direction which is controlled in the residual-stress improving apparatus according to the present invention.
Figure 6B:
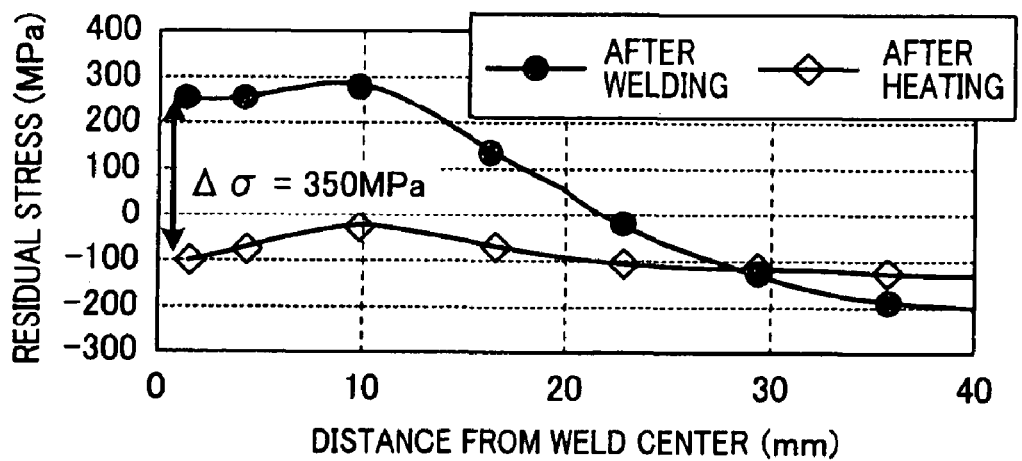
Figure 6C:
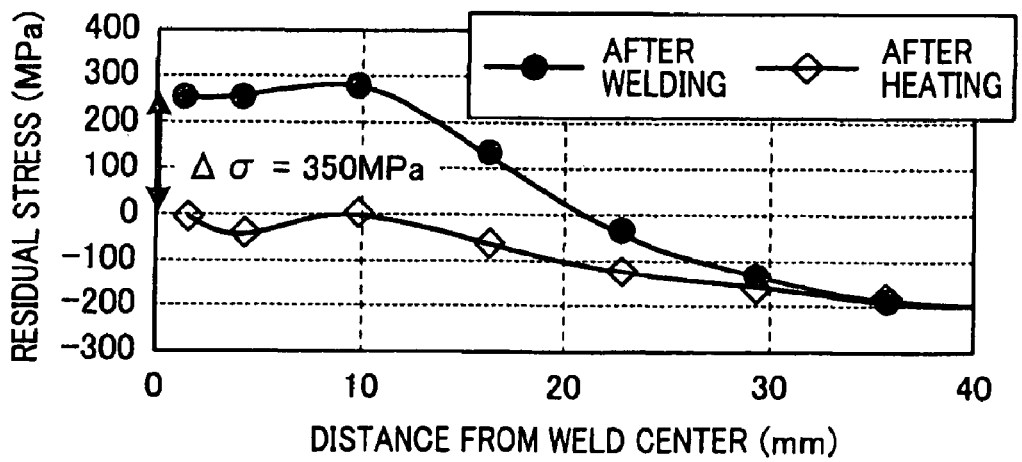
Figure 6D:
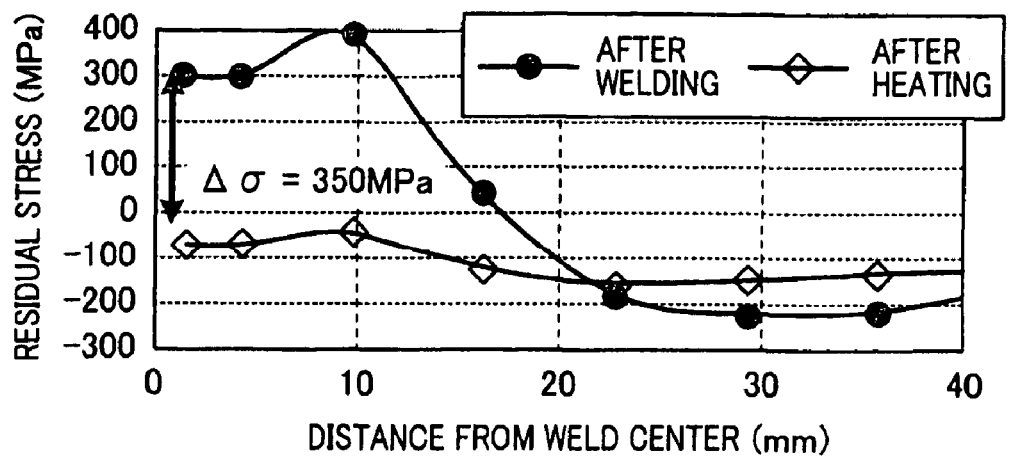
Figure 6E:
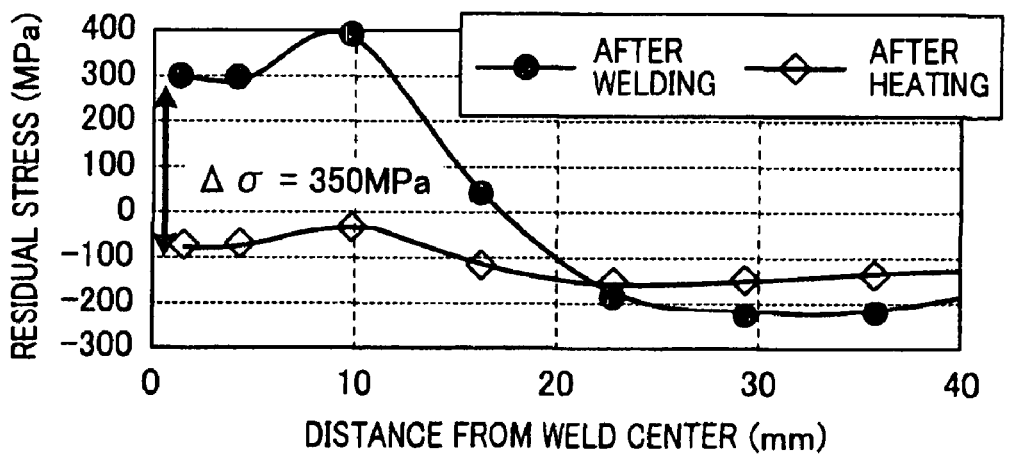
Figure 6F:
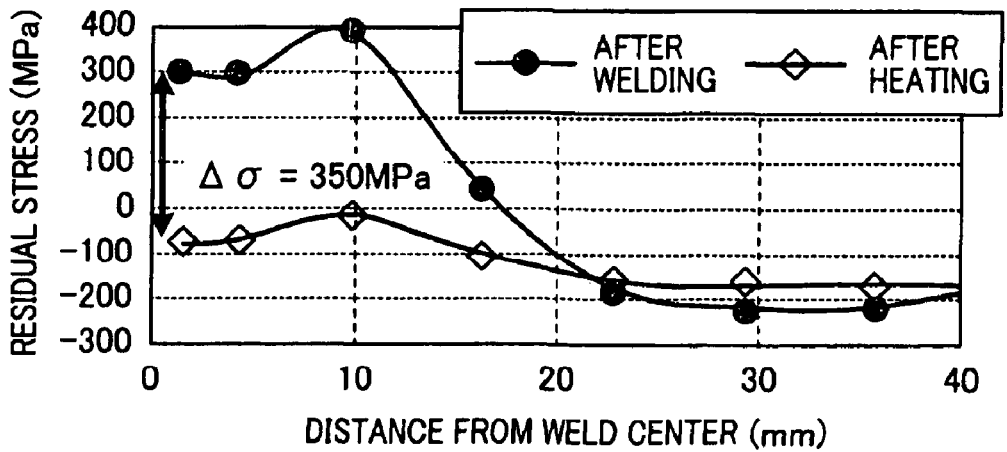

Accordingly, an examination was carried out to find out how much stress improvement could be made by variation in the heating length L in the axial direction while the heating width W in the circumferential direction was set at a constant value satisfying the above-mentioned conditions. FIG. 6 shows the examination results. FIGS. 6(a), 6(b), and 6(c) are graphs each of which illustrates the change in the stress in the axial direction. FIGS. 6(d), 6(e), and 6(f) are graphs each of which illustrates the change in the stress in the circumferential direction. Each of FIGS. 6(a) and 6(d) illustrates a case of the heating length in the axial direction $L=5\times\sqrt{(rt)}$; each of FIGS. 6(b) and 6(e) illustrates a case of the heating length in the axial direction $L=4\times\sqrt{(rt)}$; and each of FIGS. 6(c) and 6(f) illustrates a case of the heating length in the axial direction $L=3\times\sqrt{(rt)}$, where r denotes the radius of the pipe (i.e., r=D/2).

FIG. 6 demonstrates that, regarding the stress in the circumferential direction, a stress improvement of a desired magnitude or larger can be achieved irrespective of the heating length L in the axial direction. In addition, the residual-stress improvement can be observed in each of the cases of the stress in the axial direction though the magnitude of improvement in the stress in the axial direction differs depending upon the heating length L in the axial direction. Accordingly, it is preferable that the predetermined area that has a length in the axial direction of at least $3\sqrt{(rt)}$, or more preferably at least $4\sqrt{(rt)}$ be heated uniformly. To this end, the plural optical heads 5 are arranged in the arm portion 4 along the axial direction of the pipe 2 so that a desired heating length L in the axial direction can be heated uniformly.

Embodiment 2

When a tubular body such as a pipe is welded, it is not always the case that members made of the same material are welded together. Members made of different materials are sometimes welded together. Now suppose a case where the residual-stress improving apparatus 1 of the present invention shown in FIG. 1 is used for such a dissimilar tubular body that is made of different materials. In this case, to obtain an appropriate temperature difference in the wall-thickness direction, it is preferable that the heating width W in the circumferential direction be changed depending on the material to be treated in consideration of the material properties such as the thermal diffusivities of the materials.

Figure 7:
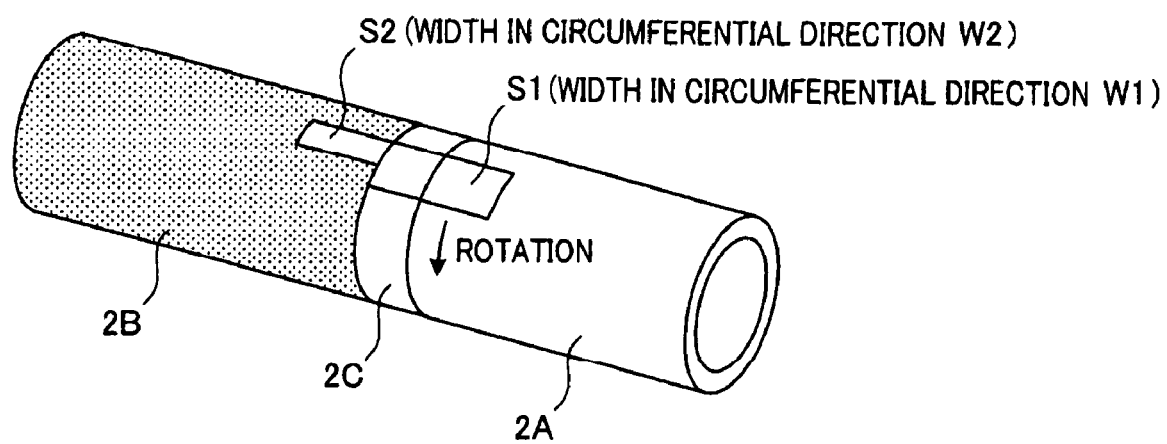
FIG. 7 is a diagram provided to explain a case where the residual-stress improving apparatus according to the present invention is used for the residual-stress improvement of a tubular-body made of plural different materials.

Suppose, for example, a case where the residual-stress improvement apparatus 1 of the present invention is used to perform laser heating on a dissimilar tubular body shown in FIG. 7 and made by welding a stainless-steel member 2A and a low-alloy steel member 2B with a nickel-base alloy weld-metal member 2C. Each of the stainless-steel member 2A and the weld metal member 2C has a small thermal diffusivity, which results in a low heat-transfer rate. Accordingly, each of the stainless-steel member 2A and the weld metal member 2C requires a larger heating width W in the circumferential direction, that is, a longer substantial heating time. By contrast, the low-alloy steel member 2B has a large thermal diffusivity, which results in a high heat-transfer rate. Accordingly, the low-alloy steel member 2B requires a smaller heating width W in the circumferential direction, that is, a shorter substantial heating time.

An examination was carried out to find out what influence the heating time (treatment speed) had on a dissimilar tubular body.

Figure 8A:
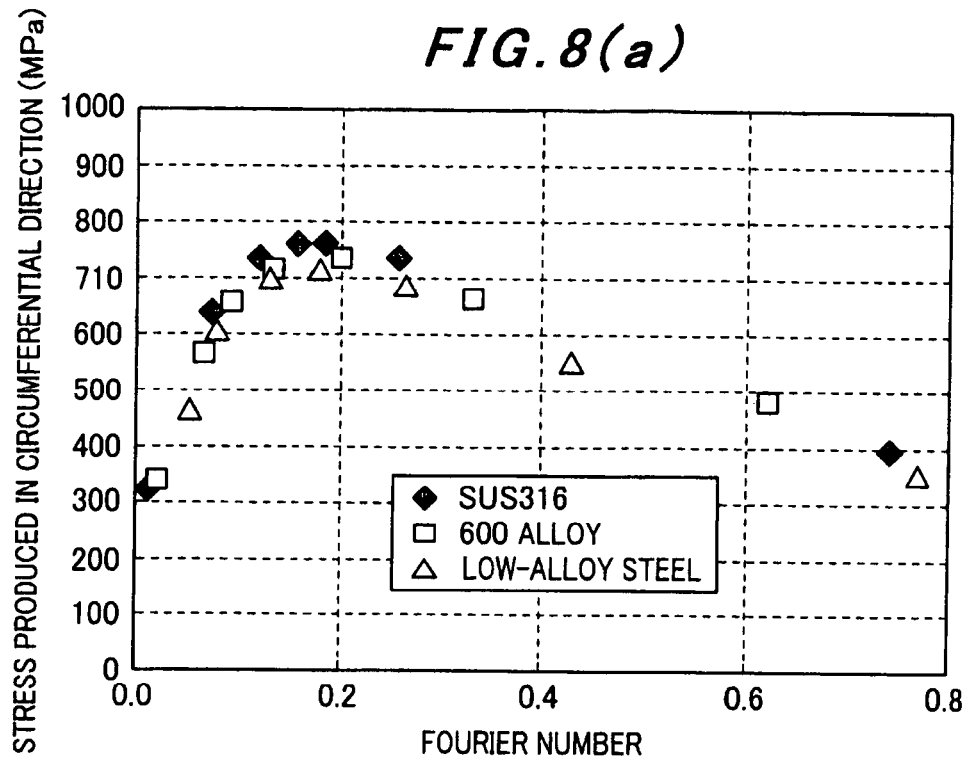
FIG. 8(a) is a graph illustrating the relationship, for each of different materials, between the stress produced in the circumferential direction and the Fourier number, in the present invention.

FIG. 8(a) is a graph illustrating the stresses produced in the circumferential direction for various materials, against the Fourier number. As FIG. 8(a) shows, the normalization with the Fourier number results in similar patterns for the stresses produced at the heating of the different materials. As described above, the Fourier number F is obtained by a formula F=thermal diffusivity $a\times$\{(heating width W in the circumferential direction/moving speed V in the circumferential direction)\}/(wall thickness t)$^2$. Accordingly, even with a constant moving speed V in the circumferential direction (circling speed), substantially the same stress can be produced for the different materials at the heating by setting different heating widths W in the circumferential direction for the different materials.

Figure 8B:
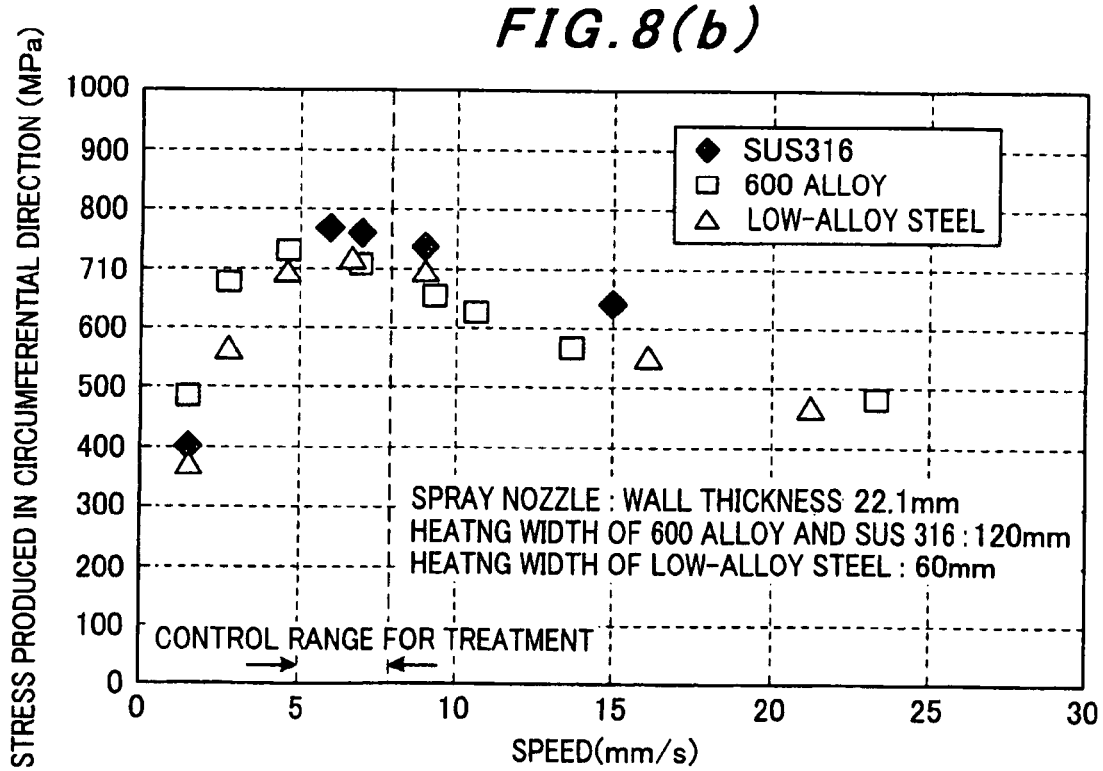
FIG. 8(b) is a graph illustrating the relationship, for each of the different materials, between the stress produced in the circumferential direction and the moving speed in the circumferential direction, in the present invention.

FIG. 8(b) is a graph of the moving speed V against the stresses produced in the circumferential direction for various materials in a case where: the wall thickness of the tubular body is approximately 22 mm; the heating width W1 for each of the member 2A made of stainless steel (SUS316) and the member 2C made of weld metal (600 alloy) is 120 mm; and the heating width W2 for the low-alloy steel member 2B is 60 mm, for example. FIG. 8(b) shows that substantially the same stress can be produced for the different materials at the heating by changing heating widths W in the circumferential direction therefor. In this respect, it was observed that the effect of improving the residual stress (stress produced by the heating) fluctuated little when the tubular body was treated at a moving speed in the circumferential direction ranging from 5 to 8 mm/s, approximately.

Embodiment 3

When a tubular body such as a pipe is welded, it is not always the case that the tubular body has a constant wall thickness therealong. The welded tubular body sometimes has various wall thicknesses that differ depending on a part of the tubular body. Now suppose a case where the residual-stress improving apparatus 1 of the present invention shown in FIG. 1 is used for such a tubular body with a variable wall thickness (i.e., a stepped tubular body). In this case, to obtain an appropriate temperature difference in the wall-thickness direction, it is preferable that the heating width W in the circumferential direction be changed in accordance with the wall thickness.

Figure 9A:
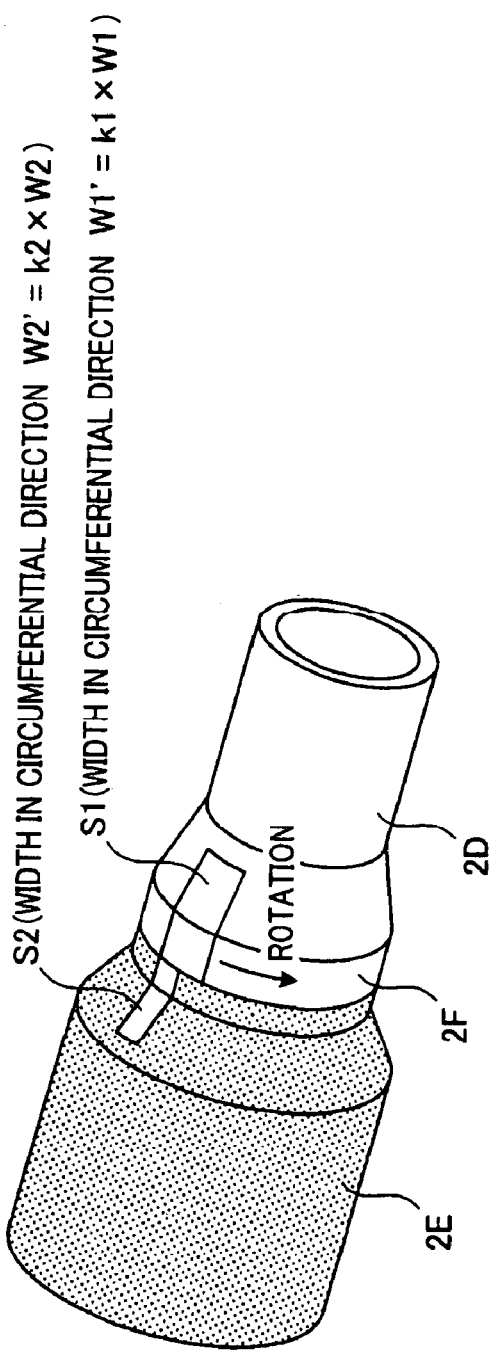
FIG. 9(a) is a diagram illustrating the external appearance of the tubular body.
Figure 9B:
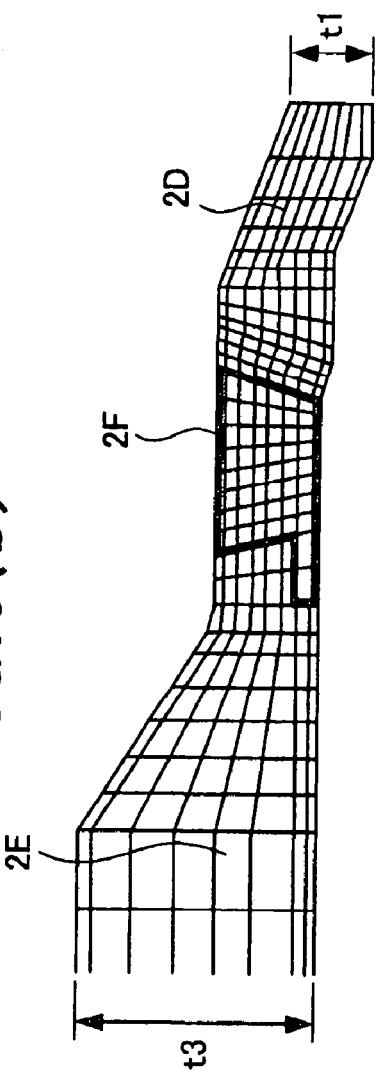
FIG. 9(b) is a diagram illustrating a section of the pipe.

Suppose, for example, a case where the residual-stress improvement apparatus 1 of the present invention is used to perform laser heating on a tubular body shown in FIGS. 9(a) and 9(b). Specifically, the tubular body includes: a pipe 2D having an average wall thickness t1; a pipe 2E having an average wall thickness t2 (>t1) and gradually increasing in thickness from the wall thickness t1 to a wall thickness t3; and a weld metal member 2F having the average wall thickness t1 and used to weld the pipes 2D and 2E together. The pipe 2D and the weld metal member 2F have the same wall thickness, and thus have the same heating width W1 in the circumferential direction. In contrast, the pipe 2E has the average wall thickness t2 that is larger than the average wall thickness t1 of the pipe 2D and of the weld metal member 2F, and thus the pipe 2E has to have a heating width W2 in the circumferential direction that is larger than the heating width W1 in the circumferential direction so as to prolong the substantial heating time. To put it differently, it is necessary that the heating width in the circumferential direction should be changed depending upon the representative wall thickness of each part to be heated. This is because, in a case of using the present invention to treat a tubular body at portions thereof having different wall thicknesses, the temperature difference in the wall-thickness direction may possibly vary depending on the portions. Accordingly, a uniform temperature difference across the entire tubular body has to be achieved by setting different heating widths in the circumferential direction for the portions of different wall thicknesses.

The tubular body shown in FIGS. 9(a) and 9(b) is a spray nozzle of a pressurizer in a PWR (Pressurized Water Reactor), which is an example to applicable target of the present invention. In such an actual case, the pipe 2D is made of stainless steel (SUS316), the pipe 2E is made of low-alloy steel, and the weld metal member 2F is made of nickel-alloy weld metal. This means that the tubular body not only has a variable wall thickness from one part to another but also is made of different materials from one part to another. Accordingly, when the heating width in the circumferential direction is determined, not only the wall thickness of each part of the tubular body but also the properties (thermal diffusivity) of the material used in that part have to be taken into consideration. In a case of such tubular body, the heating width W1' is determined by a formula W1'=k1×W1, and the heating width W2' is determined by a formula W2'=k2×W2 (k1 and k2 are coefficients determined by taking the thermal diffusivities into consideration). The pipe 2E has a large thermal diffusivity, so that the width W1' is smaller than the width W2' in the case of the tubular body shown in FIG. 9(a). For example, with the diameter of the pipe being denoted by D, the heating width in the circumferential direction for each of the pipe 2D and the weld metal member 2F is set at 0.8 D whereas the heating width in the circumferential direction for the pipe 2E is set at 0.4 D.

Figure 10:
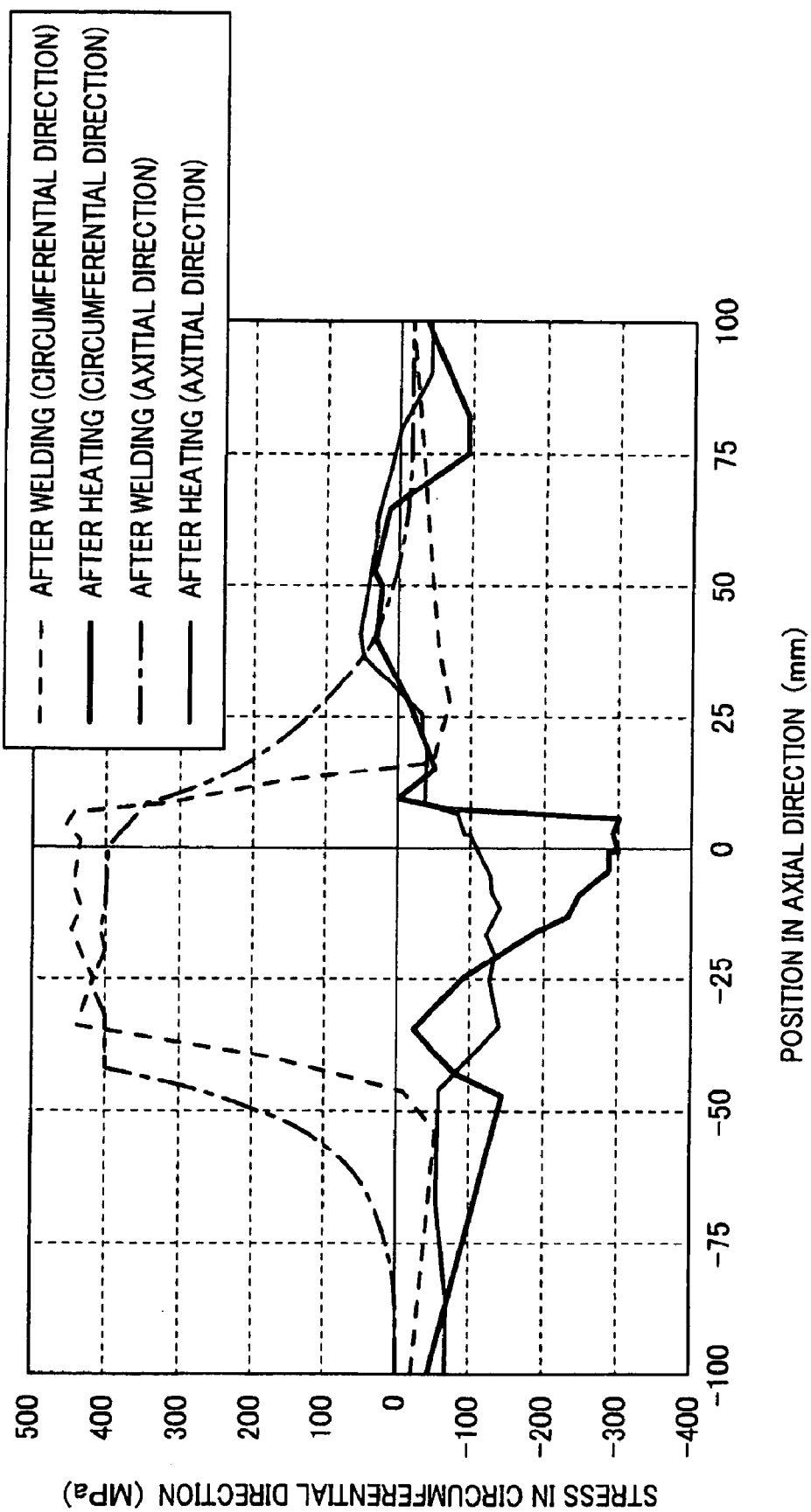
FIG. 10 is a graph illustrating the examination results of the residual-stress improving effect obtained according to the present invention.

Laser heating was performed on the tubular body shown in FIG. 9 under the above-described conditions, and the effect of improving the residual stress was examined by a numerical analysis employing a three-dimensionally moving heat-source thermal elasto-plasticity model. The examination results are shown in the graph of FIG. 10. As FIG. 10 reveals, the residual stress of a region of the weld metal member 2F simulating the welding residual stress in the inner surface (tensile stress) was improved to a compressive stress by means of the laser heating according to the present invention.

Embodiment 4

The use of the residual-stress improving apparatus 1 of the present invention shown in FIG. 1 is not necessarily accompanied by forcible cooling of the inner surface of the pipe. If, however, the residual-stress improving apparatus 1 includes cooling means such as running water or accumulated water and performs forcible cooling of the inner surface of the pipe, the heating width W in the circumferential direction and the speed V in the circumferential direction can be controlled respectively within wider ranges than the corresponding ranges in the cases of Embodiment 1 and the like. In short, providing the cooling means has an advantage of giving a larger degree of freedom when these variables are controlled.

Figure 11:
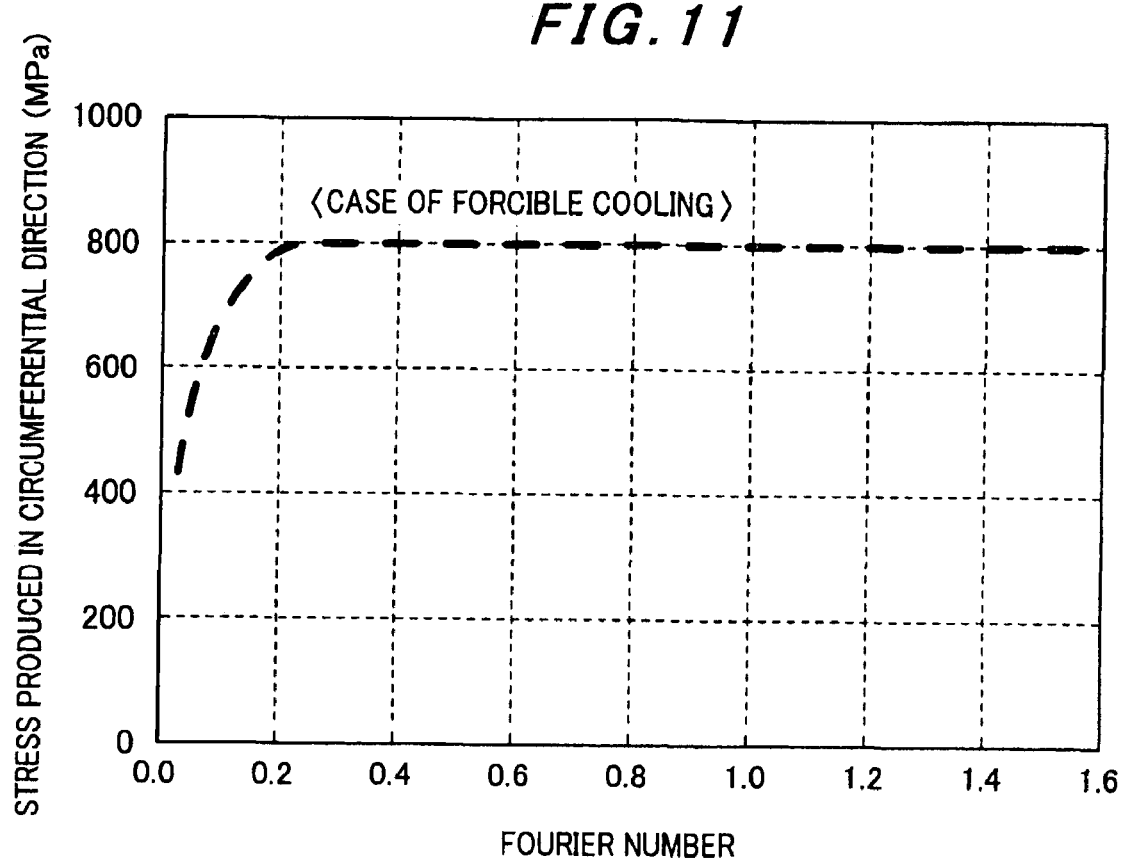
FIG. 11 is a graph illustrating the relationship between the stress produced in the circumferential direction and the Fourier number in a case where the forcible cooling is performed, in the present invention.

When the inner surface of the pipe is forcibly cooled, the stress produced in the circumferential direction and the Fourier number have a relationship as shown in FIG. 11. With a Fourier number of at least 2.0, the stress produced in the circumferential direction becomes stable at a certain constant value. Accordingly, when the inner surface of the pipe is cooled by water, the conditions for the laser heating performed on a target pipe made of stainless steel are: a Fourier number of at least 0.05 that is appropriate enough to make the stress produced by the laser heating at least as large as the yielding stress of the stainless steel (250 MPa); and a Fourier number of at least 0.1 that is appropriate enough to make the stress produced by the laser heating at least twice as large as the yielding stress of the stainless steel (500 MPa). To put it differently, when the inner surface of the pipe is forcibly cooled, the residual-stress improving apparatus 1 of the present invention has to be controlled in the following way. A predetermined area is heated by the irradiation of the predetermined area of the outer-circumferential surface of the pipe with the laser beams while the light source is being moved circling around the outer-circumferential surface. In this event, the heating width W in the circumferential direction and the moving speed V of the light source have to have a relationship that satisfies $0.05 \times t^2/a < W/V$, or preferably $0.1 \times t^2/a < W/V$. Note that the cooling water used for the forcible cooling does not have to be running water. Instead, accumulated water may be used.

Figure 12:
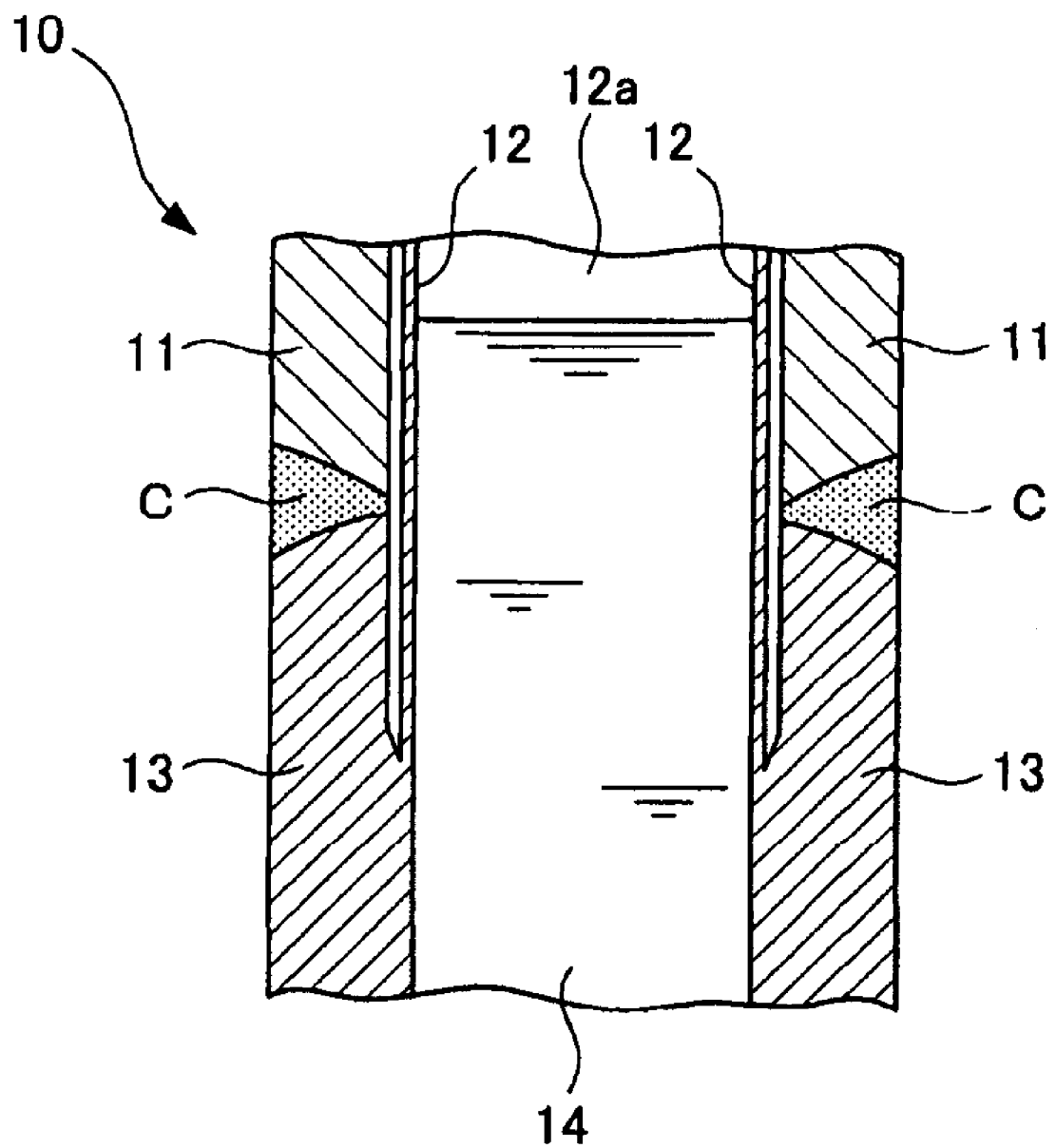
FIG. 12 is a diagram provided to explain a case where the residual-stress improving apparatus according to the present invention is used for a tubular body which is placed to extend along the vertical direction and whose inner surface is forcibly cooled.

Embodiment 4 is especially suitable for a case where a tubular body 10 formed by welding together, at a welded portion C, a pipe 11 and a double-structure pipe 13 including an inner thermal sleeve 12 is placed to extend along the vertical direction with an opening 12a of the thermal sleeve 12 positioned on the upper side as shown in FIG. 12. In the tubular body 10 having such configuration, cooling water 14 existing inside the tubular body 10 allows the heated portion to achieve a temperature rise only for a short period of time, so that a nucleate boiling state can be maintained. Accordingly, the effect of cooling the inner surface by water can be obtained even when the cooling water 14 is accumulated water. In this case of the water cooling of the inner surface, the moving speed in the circumferential direction can be slowed down, and thereby the laser output can be lowered. In addition, the vertical placement of the tubular body 10 with the opening 12a of the thermal sleeve 12 positioned on the upper side prevents the steam produced by the heating from being caught inside the tubular body 10. As a consequence, the water-cooling effect is not impaired.

Embodiment 5

Figure 13:
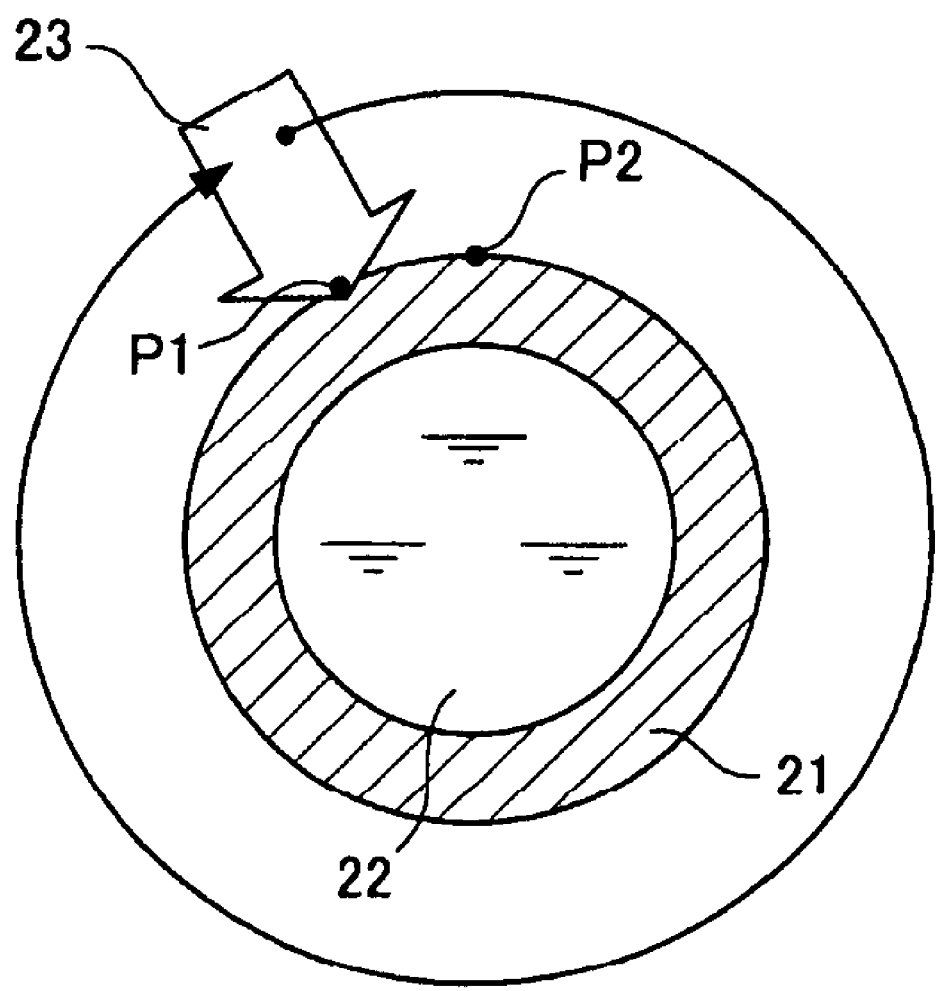
FIG. 13 is a diagram provided to explain a case where the residual-stress improving apparatus according to the present invention is used for a tubular body which is placed to extend along the horizontal direction and whose inner surface is forcibly cooled.

When the present invention is used to treat a pipe which has water accumulated inside and which is placed to extend along the horizontal direction, the starting position for the heating (the starting position of the laser-beam irradiation) has to be examined in addition to the examination of the control described above, for the following reason. When a horizontally-placed pipe 21 is heated with accumulated water 22 stored inside the pipe 21 as FIG. 13 shows, the steam produced by the boiling water 22 may possibly be caught in the vertically upper-side zone of the inside of the pipe 21, resulting in a reduced cooling efficiency. For this reason, according to Embodiment 5, to reliably perform the heating before the steam is caught in the vertically upper-side zone, the starting position (finishing position) of the irradiation with laser beams 23 is set at a position P1 which is located in a vicinity of a highest point P2 on the vertically upper side, and which is offset rearwards from the highest point P2 in the advancing direction of the laser beams 23. This setting allows uniform heating across the entire circumference of the pipe 21. A preferable position for the position P1 offset rearwards in the advancing direction is such a position that the highest point P2 of the pipe 21 can have a temperature of 100° C. or below when the laser beams 23 pass on the highest point P2. A similar control is carried out when the pipe 21 is a double-structure pipe including a thermal sleeve.

INDUSTRIAL APPLICABILITY

The cylindrically-shaped pipes subjected to the residual stress improvement in the above embodiments are used just as examples. The present invention is applicable not only to the cylindrically-shaped pipes, but to any welded curved member.

The invention claimed is:

1. A tubular-body residual-stress improving method comprising:
locally irradiating an outer-circumferential surface of a welded portion of a cylindrical tubular body with a laser beam while rotating an irradiation area in a circumferential direction,
adjusting a heating width in the circumferential direction heated by laser-beam irradiation so that a stress in the circumferential direction in an inner surface of the tubular body produced by the irradiating with the laser beam is at least larger than a yielding stress of a material that the tubular body is made of, wherein
the heating width in the circumferential direction is at least 0.15 times an external diameter of the tubular body.

2. A tubular-body residual-stress improving method comprising:
irradiating an outer-circumferential surface of a welded portion of a cylindrical tubular body with a laser beam that circles around an outer circumference of the tubular body,
adjusting a heating width in a circumferential direction heated by laser-beam irradiation and a laser-beam moving speed in the circumferential direction so that a stress in the circumferential direction in an inner surface of the tubular body produced by the irradiating with the laser beam is at least larger than a yielding stress of a material that the tubular body is made of,
wherein a Dimensionless number F is determined by a formula $F = a \times (W/V)/t^2$, where W is the heating width in the circumferential direction, V is the moving speed in the circumferential direction, a is thermal diffusivity of the tubular body, and t is a wall thickness of the tubular body, and
the heating width W in the circumferential direction and the moving speed V in the circumferential direction are determined so that the Dimensionless number F satisfies $0.05 \leq F \leq 1.4$.

3. A tubular-body residual-stress improving method comprising:
irradiating an outer-circumferential surface of a welded portion of a cylindrical tubular body with a laser beam that circles around an outer circumference of the tubular body,
adjusting a heating width in a circumferential direction heated by laser-beam irradiation and a laser-beam moving speed in the circumferential direction so that a stress in the circumferential direction in an inner surface of the tubular body produced by the irradiating with the laser beam is at least larger than a yielding stress of a material that the tubular body is made of, and
forcibly cooling an inner-circumferential surface of the tubular body,
wherein a Dimensionless number F is determined by a formula $F = a \times (W/V)/t^2$, where W is the heating width in the circumferential direction, V is the moving speed in the circumferential direction, a is thermal diffusivity of the tubular body, and t is a wall thickness of the tubular body, and
the heating width W in the circumferential direction and the moving speed V in the circumferential direction are set so that the Dimensionless number F satisfies $0.05 \leq F$.

4. The tubular-body residual-stress improving method according to claim 3, wherein,
when the tubular body is placed horizontally, the laser-beam irradiation starts at a position which is located in a vicinity of a highest point of the tubular body and which is offset rearwards from the highest point in an advancing direction of the laser beam.

5. The tubular-body residual-stress improving method according to claim 1, wherein
a plurality of laser beams are used, and an area to be heated by irradiation with the plurality of laser beams is heated uniformly in an axial direction of the tubular body.

6. The tubular-body residual-stress improving method according to claim 5, wherein,
the area to be heated has a length in the axial direction which is not shorter than $3\sqrt{(rt)}$, or preferably not shorter than $4\sqrt{(rt)}$, where t is the wall thickness of the tubular body, and r is a radius of the tubular body.

7. The tubular-body residual-stress improving method according to any one of claims 1, 2, 3, 4, and 5, wherein, when the tubular body is formed by welding members made of different materials together, and the welded portion of the tubular body is irradiated with the laser beam, different heating widths in the circumference direction are set respectively for the different materials of the tubular body.

8. The tubular-body residual-stress improving method according to any one of claims 1, 2, 3, 4, and 5, wherein when the tubular body is formed by welding members of different thicknesses together, and the welded portion of the tubular body is irradiated with the laser beam, different heating widths in the circumference direction are set respectively for the different thicknesses of the tubular body.

9. A tubular-body residual-stress improving apparatus comprising an optical head which locally irradiates an outer-circumferential surface of a welded portion of a cylindrical tubular body with a laser beam and which is capable of adjusting an irradiation area, wherein
a heating width in a circumferential direction heated by laser-beam irradiation is set by the adjustment of the optical head so that a stress in the circumferential direction in an inner surface of the tubular body produced by the irradiating with the laser beam is at least larger than a yielding stress of a material that the tubular body is made of, wherein
the heating width in the circumferential direction is at least 0.15 times an external diameter of the tubular body.

10. A tubular-body residual-stress improving apparatus comprising:
rotationally driving means which moves circling around an outer circumference of a cylindrical tubular body and whose speed of moving in a circumferential direction is controllable;
an optical head which is held by the rotationally driving means, irradiates an outer-circumferential surface of a welded portion of the tubular body with a laser beam, and is capable of adjusting an irradiation area, wherein
a heating width in the circumferential direction heated by the laser-beam irradiation is set by the adjustment of the optical head and a moving speed of the optical head in the circumferential direction is set by the control of the rotationally driving means so that a stress in the circumferential direction in an inner surface of the tubular body produced by the irradiating with the laser beam is at least larger than a yielding stress of a material that the tubular body is made of, wherein
a Dimensionless number F is determined by a formula $F=a \times (W/V)/t^2$, where W is the heating width in the circumferential direction, V is the moving speed in the circumferential direction, a is thermal diffusivity of the tubular body, and t is a wall thickness of the tubular body, and
the heating width W in the circumferential direction and the moving speed V in the circumferential direction are determined so that the Dimensionless number F satisfies $0.05 \leq F \leq 1.4$.

11. A tubular-body residual-stress improving apparatus comprising:
rotationally driving means which moves circling around an outer circumference of a cylindrical tubular body and whose speed of moving in a circumferential direction is controllable;
an optical head which is held by the rotationally driving means, irradiates an outer-circumferential surface of a welded portion of the tubular body with a laser beam, and is capable of adjusting an irradiation area, and
cooling means for forcibly cooling an inner-circumferential surface of the tubular body, wherein
a Dimensionless number F is determined by a formula $F=a \times (W/V)/t^2$, where W is the heating width in the circumferential direction, V is the moving speed in the circumferential direction, a is thermal diffusivity of the tubular body, and t is a wall thickness of the tubular body, and
the heating width W in the circumferential direction and the moving speed V in the circumferential direction are set so that the Dimensionless number F satisfies $0.05 \leq F$.

12. The tubular-body residual-stress improving apparatus according to claim 11, wherein,
when the tubular body is placed horizontally,
the rotationally driving means makes the laser-beam irradiation start at a position which is located in a vicinity of a highest point of the tubular body and which is offset rearwards from the highest point in an advancing direction of the laser beam.

13. The tubular-body residual-stress improving apparatus according to claim 9, wherein
a plurality of the optical heads are arranged in an axial direction of the tubular body, and an area to be heated by irradiation with laser beams from the plurality of the optical heads is heated uniformly in the axial direction of the tubular body.

14. The tubular-body residual-stress improving apparatus according to claim 13, wherein,
the area to be heated is set to a length in the axial direction which is not shorter than $3\sqrt{(rt)}$, or preferably not shorter than $4\sqrt{(rt)}$, where t is the wall thickness of the tubular body, and r is a radius of the tubular body.

15. The tubular-body residual-stress improving apparatus according to any one of claims 9, 10, 11, 12 and 13, wherein, when the tubular body is formed by welding members made of different materials together, and the welded portion of the tubular body is irradiated with the laser beam, different heating widths in the circumference direction are set respectively for the different materials of the tubular body.

16. The tubular-body residual-stress improving apparatus according to any one of claims 9, 10, 11, 12 and 13, wherein, when the tubular body is formed by welding members of different thicknesses together, and the welded portion of the tubular body is irradiated with the laser beam, different heating widths in the circumference direction are set respectively for the different thicknesses of the tubular body.

17. The method according to claim 1, wherein the heating width in the circumferential direction is at least 0.4 times the external diameter of the tubular body.

18. The method according to claim 2, wherein the Dimensionless number F satisfies $0.1 \leq F \leq 0.6$.

19. The method according to claim 3, wherein the Dimensionless number F satisfies $0.1 \leq F$.

20. The method according to claim 9, wherein the heating width in the circumferential direction is at least 0.4 times the external diameter of the tubular body.

21. The method according to claim 10, wherein the Dimensionless number F satisfies $0.1 \leq F \leq 0.6$.

22. The method according to claim 11, wherein the Dimensionless number F satisfies $0.1 \leq F$.

* * * * *